US009336489B2

(12) United States Patent
Talwadker et al.

(10) Patent No.: US 9,336,489 B2
(45) Date of Patent: May 10, 2016

(54) TECHNIQUES FOR HANDLING MODELING ERRORS DURING PLANNING

(71) Applicant: NetApp, Inc., Sunnyvale, CA (US)

(72) Inventors: Rukma Talwadker, Bangalore (IN); Kaladhar Voruganti, Sunnyvale, CA (US); David Slik, Northridge, CA (US)

( * ) Notice: Subject to any disclaimer, the term of this patent is extended or adjusted under 35 U.S.C. 154(b) by 0 days.

(21) Appl. No.: 14/513,044

(22) Filed: Oct. 13, 2014

(65) Prior Publication Data

US 2015/0032683 A1 Jan. 29, 2015

Related U.S. Application Data

(63) Continuation of application No. 13/272,806, filed on Oct. 13, 2011, now Pat. No. 8,862,535.

(51) Int. Cl.
G05B 13/04 (2006.01)
G06N 7/04 (2006.01)
H04L 29/08 (2006.01)
G06N 5/04 (2006.01)

(52) U.S. Cl.
CPC ............. *G06N 5/048* (2013.01); *G05B 13/04* (2013.01); *H04L 67/10* (2013.01)

(58) Field of Classification Search
None
See application file for complete search history.

(56) References Cited

U.S. PATENT DOCUMENTS 8,862,535 B1 10/2014 Talwadker et al.

OTHER PUBLICATIONS

Yin06, Automatic Action Advisor for Storage System Performance Management [online], Nov. 28, 2006 [retrieved on Jun. 28, 2015]. Retrieved from the Internet:<URL:http://www.google.com/url?sa=t&rct=j&q=&esrc=s&source=web&cd=2&cad=rja&uact=8&ved=0CCYQFjAB&url=http%3A%2F%2Fwww.eecs.berkeley.edu%2FPubs%2FTechRpts%2F2006%2FEECS-2006-160.pdf>.*
Shivam et al., Learning Application Models for Utility Resource Planning. In Intl. Conf. on Automatic Computing [online], Jun. 2006 [retrieved on Sep. 16, 2013]. Retrieved from the Internet: ,URL: http://www.researchgate.net/publication/221210731_Learning_Application_Models_for_Utility_Resource_Planning.
U.S. Appl. No. 12/952,053, filed Nov. 23, 2010.
U.S. Appl. No. 13/016,889, filed Jan. 28, 2011.
Non-Final Office Action dated Feb. 24, 2014 in U.S. Appl. No. 13/272,806.
Notice of Allowance dated Jun. 19, 2014 in U.S. Appl. No. 13/272,806.

* cited by examiner

*Primary Examiner* — Stanley K Hill
*Assistant Examiner* — Nathan Brown, Jr.
(74) *Attorney, Agent, or Firm* — Gilliam IP PLLC

(57) ABSTRACT

In the area of storage management, service automation can be realized through the use of "MAPE" loop(s). A Planner (P) interacts with the Monitoring (M), Analysis (A) and Execution (E) components in a closed loop. For each new option or potential planning action the Planner (P) invokes the Analysis (A) component. The correctness, as well as effectiveness, of the planning decision is dependent on the Analysis (A) component. Embodiments can utilize an adaptive Analysis (A) component (i.e., an analysis component that can be retrained) that also associates a value of confidence and a corresponding error in the evaluation along with a predicted impact. The Planner (P) component uses this additional information for quoting the final impact of a particular planning action as part of an adaptive MAPE loop to provide improved resource utilization and resource management.

20 Claims, 8 Drawing Sheets

TECHNIQUES FOR HANDLING MODELING ERRORS DURING PLANNING

CROSS-REFERENCE TO RELATED APPLICATIONS

This application is a continuation of U.S. application Ser. No. 13/272,806 filed on Oct. 13, 2011, the content of which is hereby incorporated by reference herein in its entirety for all purposes.

TECHNICAL FIELD

Various embodiments generally relate to evaluating proposed storage solutions within a storage system. More specifically, some embodiments relate to systems and methods for the handling of modeling errors during planning.

BACKGROUND

A storage server is a computer that provides storage services relating to the organization of data on writable, storage media, such as non-volatile memories and disks. A storage server may be configured to operate according to a client/server model of information delivery to enable many clients (e.g., applications) to access the data served by the system. A storage server can employ a storage architecture that serves the data with both random and streaming access patterns at either a file level, as in network attached storage (NAS) environments, or at the block level, as in a storage area network (SAN). Storage servers store data on various types of non-volatile storage media such as, for example, relatively high latency (i.e., longer access times) hard disk drive devices (HDDs) and relatively low latency (i.e., shorter access times) solid-state devices (SSDs) such as flash memory or DRAM.

A network storage system may be configured in many ways. For example, the network storage system may be a monolithic, non-distributed storage server or may be clustered to allow many storage clients to access data containers that are stored in the storage system and managed by one or more storage servers. For example, a client may execute an application, such as a database application, that "connects" to the storage system over a computer network, such as a point-to-point link, shared local area network (LAN), wide area network (WAN), or virtual private network (VPN) implemented over a public network such as the Internet. Each client may request the data services of the storage system by issuing access requests (read/write requests) as file-based and block-based protocol messages (in the form of packets) to the system over the network.

In addition, each client may execute numerous applications requiring the data services of the network storage system. As such, each application may be considered a workload that is serviced by the network storage system. Each workload may have one or more specified service-level objectives (SLOs) relating to a storage system characteristic or attribute, such as a performance or protection metric. For example, a workload may have an SLO specifying a minimum value of X (the target value) for data throughput (the SLO metric) to be achieved by the network storage system when servicing the workload.

In many cases, a network storage system will simultaneously service numerous workloads of different types and with varying levels of service, as specified by the SLOs. In this situation, performance and protection problems may arise because different types of workloads can interfere with each other. The increasing size and complexity of modern network storage systems has made storage capacity planning and storage administration, for ensuring that all SLOs of all workloads are achieved, very difficult.

For example, evaluating proposed storage solutions for meeting SLOs and accurately predicting their results prior to execution can be difficult given the dynamic nature of the storage system. Moreover, if a solution has to be reversed (e.g., because a solution does not achieve the intended results), a substantial amount of time and resources may be necessary to reverse the implemented solution. As such, systems and methods for accurately predicting results of each proposed solution are needed.

SUMMARY

Various embodiments of the techniques introduced here generally relate to evaluating proposed storage solutions within a storage system, such as a network storage system. To evaluate proposed storage solutions one or more models of the system are used. The evaluation of the proposed storage solution using these models can each have a different error level and/or different confidence level regarding the accuracy and reliability of the evaluation. Moreover, without this information regarding the error and confidence, the evaluation of the proposed storage solution can be misleading. Various embodiments use this information regarding the error and confidence of the evaluation to more accurately quote the final impact of a proposed storage solution.

More specifically, some embodiments relate to systems and methods for the handling of modeling errors to more accurately understand the impact of one or more proposed storage solutions. For example, some embodiments provide for a method comprising requesting, from an analysis engine, data representing a prediction of an impact on a storage system of implementing a planning action on the storage system. The data can be based on a first model of the storage system and include parameters indicative of modeling error and/or modeling confidence (e.g., a modeling error indicator representing accuracy of the prediction and/or a modeling confidence indicator representing reliability of the prediction) associated with implementing the planning action on the storage system. Then, using a processor, a determination can be made whether to implement the planning action.

Embodiments of the present invention also include other methods, systems with various components, and computer-readable storage media containing sets of instructions to cause one or more processors to perform the methods, variations of the methods, and other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
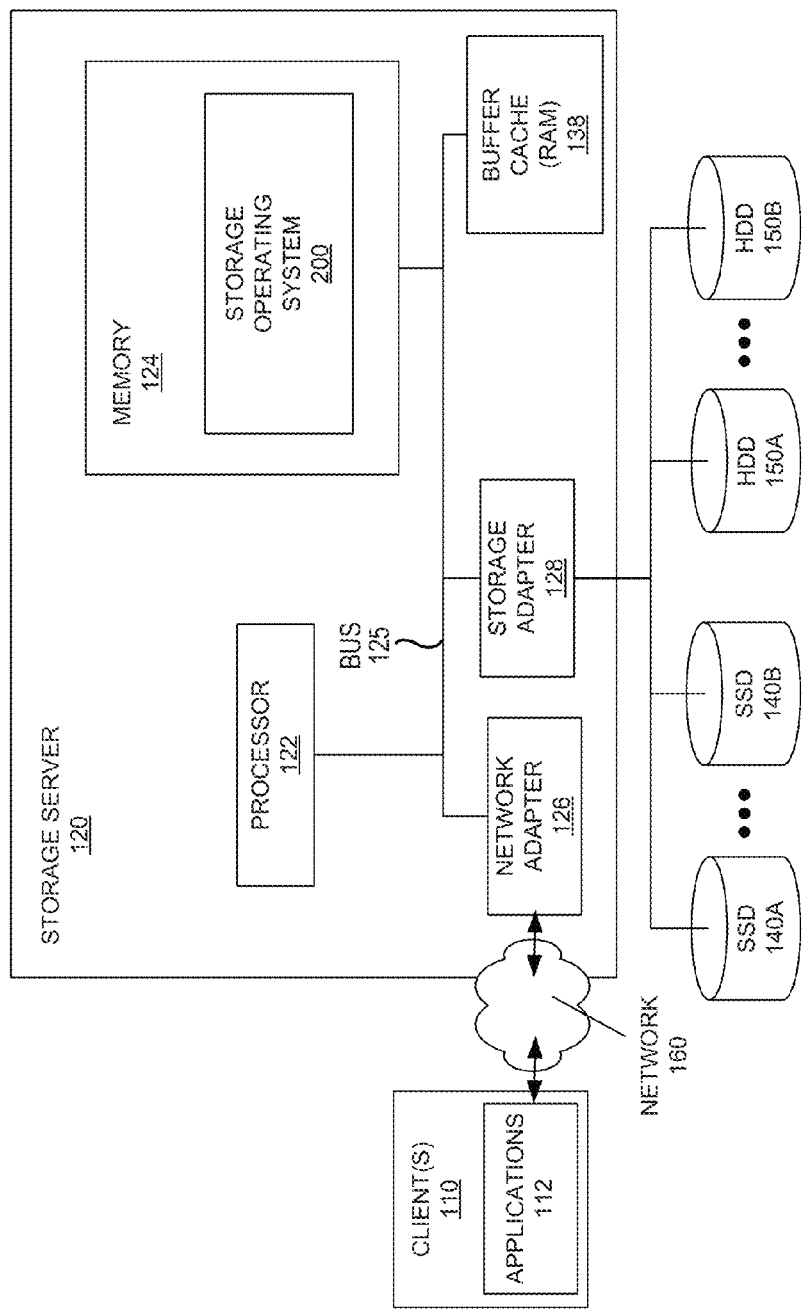
FIG. 1 shows a block diagram of a storage system in which some embodiments may be implemented or utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the technique introduced here generally relate to evaluating proposed storage solutions within a storage system. More specifically, some embodiments relate to systems and methods for the handling of modeling errors during planning.

Service automation can be valuable in the context of storage management. One goal of service automation, according to the technique introduced here, is to automate the process of storage management based on high-level service level objectives (SLOs). This, in turn, increases resource utilization and also increases the amount of resources managed by a single administrator. Various embodiments disclosed here realize service automation in the context of storage management through "MAPE" loop(s). A MAPE loop includes monitoring resource utilization/violation (M), analyzing the impact of change (A), planning to choose the appropriate corrective action (P) and then executing the corrective action (E). Numerous MAPE loops can exist within, or be associated with, a storage system. Accordingly, it is important to coordinate these various MAPE loops in an integrated manner. The planning (P) aspect of the MAPE loop determines where and when to create data (new provisioning) or move data (migration).

In accordance with some embodiments, the planning engine can interact with the monitoring, analysis, and execution components in a closed loop. For each new storage option or solution (e.g., new workload provisioning or existing workload migration) the planner invokes the analysis component to analyze each new option or solution. The correctness, as well as effectiveness, of the planning decision is dependent to a large extent on the analysis component. Various embodiments provide for an impact analysis module configured to associate a value of confidence and a corresponding error in the prediction along with its prediction. Confidence values can help to fortify the analysis predictions based on the predicted value. Similarly, the error associated with the predictions can help the planner to make a more conservative or more aggressive planning decision as warranted by the situation.

Some embodiments utilize a framework for leveraging the modeling errors to help the planner make an appropriate decision regarding one or more proposed solutions. In addition, one or more embodiments can also correct consistently high errors in predictions by triggering a model re-building process as a back call to the analysis module.

The technique introduced here can be embodied as special-purpose hardware (e.g., circuitry), or as programmable circuitry appropriately programmed with software and/or firmware, or as a combination of special-purpose and programmable circuitry. Hence, embodiments of the present invention may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In this description, the phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

FIG. 1 shows a block diagram of a storage system 100 in which some embodiments of the present invention may be implemented or utilized. In the embodiments shown in FIG. 1, storage system 100 includes a storage server 120 having one or more processors 122, a memory 124, a network adapter 126, a storage adapter 128 and buffer cache 138 interconnected by a system bus 125. The storage server 120 can be a computer that provides storage services relating to the organization of information on writable, persistent storage media, such as SSDs and HDDs. The storage server 120 also includes a storage operating system 200 that implements a file system to logically organize the stored data as a hierarchical structure of logical data containers (e.g., volumes, logical units, directories and/or files) on the electronic storage media 140 and magnetic storage media 150.

It will be understood by those skilled in the art that this description may apply to any type of special-purpose computer (e.g., file server or storage serving appliance) or general-purpose computer embodied as, or having a storage server including a standalone computer or portion thereof. While FIG. 1 illustrates a monolithic, non-distributed storage server 120, various embodiments are applicable to other types of storage configurations (e.g., cluster storage configurations). Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements including a storage server that provides file-based access to data, block-based access to data, or both.

Memory 124 includes storage locations that are addressable by the processor(s) 122 and adapters and can store software programs and data structures to carry out the techniques described herein. Processor(s) 122 and adapters may, in turn, include processing elements and/or logic circuitry configured to execute the software programs and manipulate the data structures. The storage operating system 200, portions of which is typically resident in memory 124 and executed by the processor(s) 122, functionally organizes the storage server by invoking storage operations in support of software processes executing on the server 120. It will be apparent to those skilled in the art that other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes circuitry and mechanical components needed to connect the storage server 120 to a client 110 over a computer network 160, which may include a point-to-point (P2P) connection or a shared medium. Network 160 can be any group of interconnected devices capable of exchanging information. In some embodiments, network 160 may be as few as several personal computers, special purpose computers, and/or general purposed computers on a Local Area Network (LAN) or as large as the Internet. In some cases, network 160 may be comprised of multiple networks (private and/or public), even multiple heterogeneous networks, such as one or more border networks, broadband networks, service provider networks, Internet Service Provider (ISP) networks, and/or Public Switched Telephone Networks (PSTNs), interconnected via gateways operable to facilitate communications between and among the various networks.

Client 110 may be a general-purpose computer configured to execute applications 112, such as a database application. Moreover, the client 110 may interact with the storage server 120 in accordance with a client/server model of information delivery. That is, the client(s) 110 may request the services of the storage server 120 and the system may return the results of the services requested by the client 110, such as by exchanging packets over the network 160. The client(s) 110 may issue packets including file-based access protocols such as the Common Internet File System (CIFS) protocol or Network File System (NFS) protocol over TCP/IP when accessing information in the form of files. Alternatively, the client(s) 110 may issue packets including block-based access protocols such as the Small Computer Systems Interface (SCSI) protocol encapsulated over TCP (iSCSI) and SCSI encapsulated over Fibre Channel Protocol (FCP) when accessing information in the form of LUNs or blocks.

The storage adapter 128 cooperates with the storage operating system 200 executing on the storage server 120 to access information requested by the client 110. The information may be stored on the electronic storage media 140 and magnetic storage media 150, which are illustratively embodied as SSDs and HDDs. The storage adapter includes input/output (IO) interface circuitry that couples to the SSD 140 and HDD 150 over an IO interconnect arrangement, such as a conventional high-performance Fibre Channel serial link topology. The information is retrieved by the storage adapter 128 and, if necessary, processed by the processor(s) 122 (or the adapter 128) prior to being forwarded over the system bus 125 to the network adapter 126 where the information is formatted into a packet and returned to the client 110.

In the illustrated embodiments, buffer cache 138 is coupled with the memory 124 over the system bus 125. However, this is by way of example and not of limitation as the buffer cache 138 may be coupled with the memory using, for example, a point-to-point connection. In addition, the buffer cache 138 may be separate from the memory 124 (as illustrated), part of the memory 124, or part of the processor(s) 122. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs or HDDs. In this manner, a buffer cache, such as buffer cache 138, reduces memory access times by avoiding having to access persistent storage to obtain the data.

Figure 2:
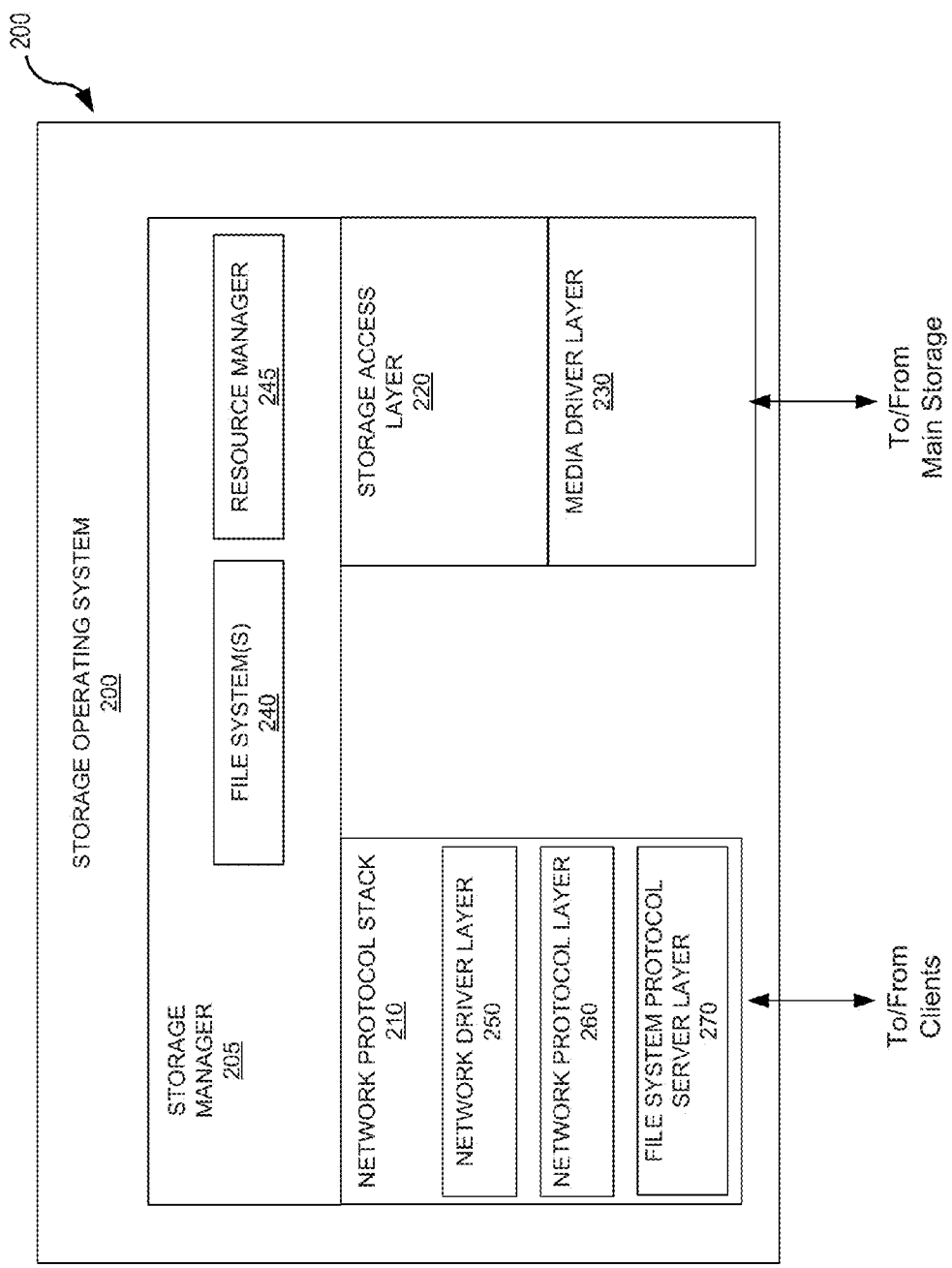
FIG. 2 shows a block diagram of a storage operating system.

FIG. 2 shows an example of the storage operation system 200. While FIG. 2 illustrates a storage operation system applicable to a monolithic, non-distributed system, other embodiments can have storage operation systems applicable to distributed storage systems (e.g., a cluster storage system). As used herein, the term "storage operating system" generally refers to the computer-executable code operable on a computer to perform a storage function that manages data access. The storage operating system can also be implemented as a microkernel, an application program operating over a general-purpose operating system such as UNIX® or Windows NT®, or as a general-purpose operating system configured for the storage applications as described herein. In the illustrated embodiments, the storage operating system includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.).

In addition, the storage operating system 200 includes a storage access layer 220 that implements a storage media protocol such as a Redundant Array of Independent Disks/Devices (RAID) protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller.

Bridging the storage media software layers with the network and file system protocol layers is a storage manager 205 that implements one or more file system(s) 240. In one embodiment, the storage manager 205 implements data layout algorithms that improve read and write performance to the electronic storage media 140 and magnetic storage media 150. For example, storage manager 205 can be configured to perform initial placement and relocation of the data among multiple tiers of heterogeneous storage media of a hybrid storage aggregate and to allow clients to access any subsystems configured to perform the storage functions described herein.

Resource manager 245, in accordance with various embodiments, can manage and/or allocate storage resources and/or workloads within storage server 120. In some cases, resource manager 245 can use MAPE loops to automate the process of storage management based on high level service level objectives (SLOs). For example, resource manager 245 may use a planner to evaluate new options or solutions based on an impact predicted by an analysis module. As discussed in more detail below, the planner can be configured to utilize a modeling error and a confidence value provided by the analysis module for each solution. A solution generally refers to a set of one or more planning actions to be executed within the storage system (e.g., on a cluster). Examples of planning actions include, but are not limited to, migrating a storage object (e.g., a volume), resizing (increasing or decreasing storage size) a storage object, extra resource provisioning (adding storage resources), compressing or deduplicating a storage object, creating or scheduling a backup snapshot of a storage object, etc.

Figure 3:
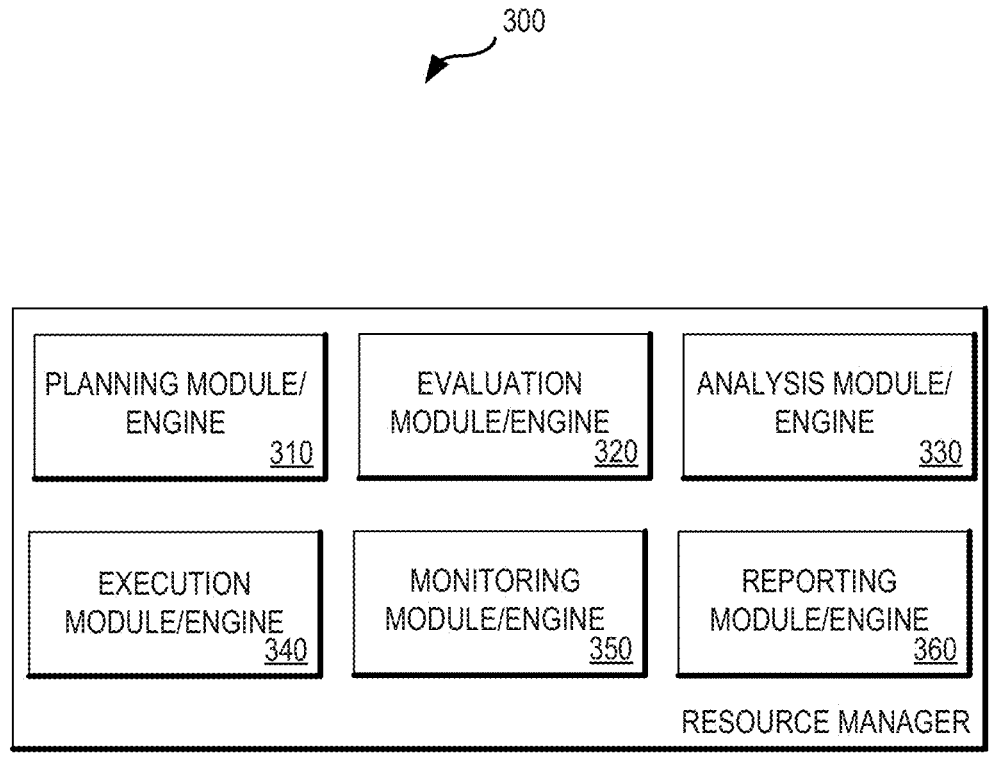
FIG. 3 is a block diagram of components of a resource manager.

FIG. 3 is a block diagram of an example of a resource manager 300. The resource manager can reside within the storage system as illustrated in FIG. 2. However, in some cases, resource manager 300 may reside outside, or independent, of a storage operation system 200. According to the embodiments shown in FIG. 3, resource manager 300, whether residing on storage operation system 200 or as an external component, can include planning module 310, evaluation module 320, analysis module 330, execution module 340, monitoring module 350, and reporting module 360. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special-purpose and programmable circuitry. Other embodiments may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, monitoring module 350 and reporting module 360 can be combined into a single module.

Memory 124 may be used to store instructions for operating one or more applications or modules on processor(s) 122. For example, memory 124 could be used in one or more embodiments to house all or some of the instructions needed to execute the functionality of planning module 310, evaluation module 320, analysis module 330, execution module 340, monitoring module 350, and/or reporting module 360.

Planning module 310, in some embodiments, is configured to determine whether or not to implement a potential planning action. The determination can be based upon a predicted response of a storage system or storage server upon implementation of the potential planning action. In many embodiments, the determination of whether or not to implement the potential planning action can also be based on a model confidence indicator and/or a model error indicator.

In some embodiments, evaluation module 320 can be part of planning module 310. In addition, evaluation module 320 can be configured to generate an adjusted service level objective (SLO) evaluation value for the potential planning action based on an SLO evaluation of the potential planning action, the model confidence indicator and/or the model error indicator.

The SLO evaluation used in various embodiments can be a value independent of the quantity being measured and/or a normalized value to quantify the impact of a planning action on any metric of interest on a particular SLO guaranteed entity (e.g., a workload, cluster node etc.). As a result, the values can be directly compared regardless the quantity being measured. There are many ways to compute an SLO evaluation for the potential planning action. For example, one or more cost metrics can be used that specify cost metrics to be processed by the evaluation module 320 when producing the SLO evaluation for a proposed state/solution. A cost metric can represent a particular type of cost (a particular type of resource utilization) that affects the cost evaluation value produced for a proposed planning action, state, or solution. The cost metrics can include start costs comprising a one-time cost predicted to be incurred when first executing the proposed state/solution and/or recurring costs comprising an ongoing recurring cost predicted to be incurred when maintaining the proposed state/solution.

In some cases, the computation can specify an SLO metric (e.g., data throughput) and assign a weight value representing the relative importance of the SLO metric. An evaluation function can specify a particular mathematical process (e.g., as represented through an equation) for processing the set of SLO evaluation values and the set of cost evaluation values (e.g., by summing and taking the average for these sets of values). The evaluation function can also apply a set of cost weights (e.g., specified by optimization goals) to the set of cost evaluation values and a set of SLO weights (specified by the SLO weights) to the set of SLO evaluation values to produce a final evaluation value for the proposed state/solution.

In some embodiments, the SLO evaluation function can be represented as:

$$s(v)=1-x^p$$

where:
s(v)=SLO evaluation value;
x=(predicted value of SLO metric/target value of SLO metric)$^{-y}$;
y∈{−1,1} depending on the SLO metric, where y=−1 for a "lower is better" SLO metric and y=1 for a "higher is better" SLO metric; and
p=priority of the workload.

Various embodiments of evaluation module 320 use alternate methods for augmenting the evaluation using the confidence indicator and/or the model error indicator to create an adjusted evaluation value. Using the adjusted evaluation value can provide various advantages for at least two reasons. First, as discussed in more detail below, analysis module 330 can use any of various modeling technologies (e.g., a black box model, a pure white box model, an empirical model, etc.). The confidence indicator and the error indicator associated with such different mechanisms of predictions carry a lot of value that can be leveraged to avoid planning inaccuracies. Second, the value of error and confidence themselves carry a lot of information on the relevance and applicability of the predicted value by the model and hence its usefulness in planning and choosing a particular option.

In one embodiment, analysis module 330 is communicably coupled to planning module 310 and is configured to receive a request (e.g., from planning module 310) to evaluate one or more potential planning actions. Analysis module 330 may be located on the same computer as planning module 310 in which case a simple API call to the analysis module with the necessary arguments may be utilized. However, if analysis module 330 and planning module 310 are not collocated, e.g., the modules are physically separated or are running on different computers, a possible remote procedure call (RPC) with the same arguments may be used.

In some embodiments, the arguments to analysis module 310 may include one or more of the following: the topography of the system in the context of which an evaluation is being sought, the changed hypothetical configuration under evaluation, the time window of observation/compliance for workload behavior modeling, and/or tolerance for non conformance (e.g., 89% of observations in the time window of one hour, measured at a granularity of a minute should be in conformance with the corresponding metric SLO targets). However, as described above, planning module 310 and analysis module 330 both query the monitoring module 350 and are likely to be aware of at least some part of the system topography. As a result, planning module 310 might not provide the topography of the system as an input to analysis module 330, but instead just identify the changed hypothetical system configuration to be evaluated along with possibly one or more other inputs.

In response to this request, analysis module 330 predicts the response of the storage system upon implementation of the one or more potential planning actions, a model confidence indicator, and a model error indicator based on a model in the model library. Planning module 310 then determines which, if any, of the one or more planning actions to execute, based on the predicted response and model evaluation parameters (e.g., the model confidence indicator and/or the model error indicator) determined by the analysis module 330. The storage system being evaluated can be separate from the resource manager or the same storage system on which the resource manager resides.

After planning module 310 determines which, if any, of the one or more planning actions to execute, planning module 310 sends a request to execution module 340. Execution module 340 is configured to receive the request to implement the potential planning action and to initiate execution of the potential planning action on the storage system. Monitoring module 350 then monitors performance characteristics of the storage system and reports the performance characteristics to the planning engine. In some embodiments, monitoring module 350 reports back to planning module 310 the results of the execution of the implemented planning action on the storage system. Planning module 310 then determines if the predicted impact reported by analysis module 330 sufficiently differs from the actual impact in such a way as to trigger a retraining request from planning module 310.

In some embodiments, reporting module 360 is configured to receive external reports regarding system performance. For example, the external report regarding system performance can originate from end users who are monitoring performance data, customer observed events, e-mail, third-party monitoring services, and other reporting mechanisms. This information can be used to trigger model retraining in some cases when a model routinely fails to adequately predict the impact of planning actions.

Figure 4:
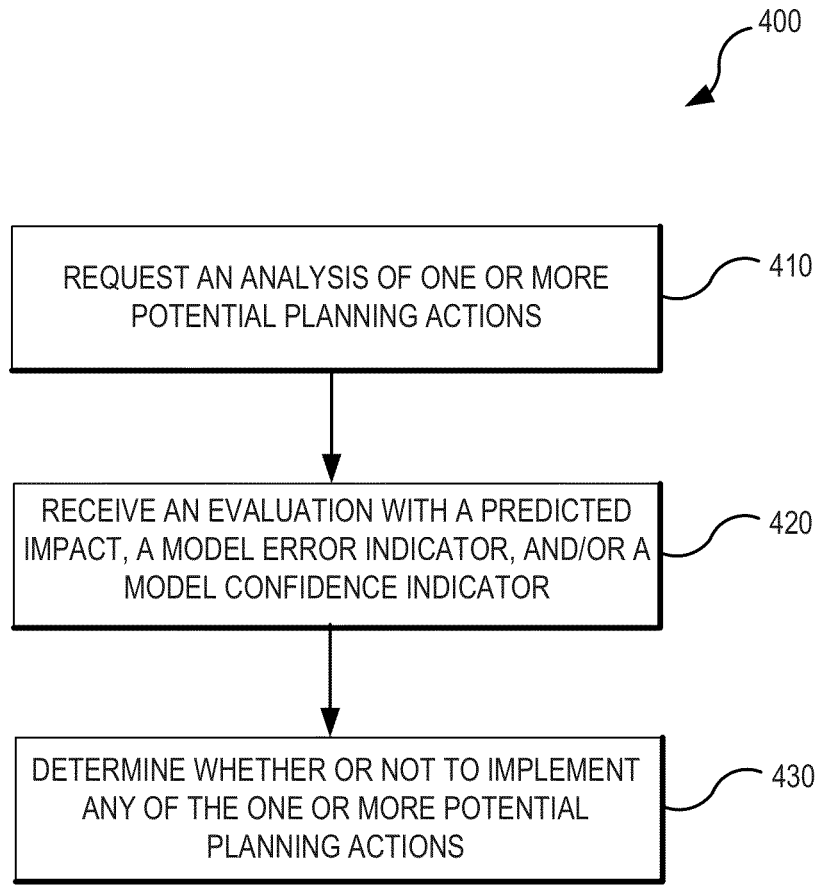
FIG. 4 is a flow chart illustrating a process for evaluating one or more planning actions.

FIG. 4 is a flow chart 400 illustrating a process for evaluating one or more planning actions. The operations described within this process can be performed, for example, by planning module 310. In the embodiments illustrated in FIG. 4, requesting operation 410 requests an analysis of one or more potential planning actions. The possible planning actions could have originated from a resource manager 245 or 300 in an attempt to satisfy one or more SLOs. As another example, a system administrator could have submitted one or more of the possible planning actions for evaluation.

Receiving operation 420 receives an evaluation of the potential planning actions. In accordance with various embodiments, each evaluation can include a predicted impact of implementing the potential planning action, a model error indicator, and/or a model confidence indicator. Using the evaluations, determination operation 430 determines whether or not to implement any of the one or more potential planning actions. In some cases, determination operation 430 can be performed by planning module 310 which can utilize the values predicted by the analysis component 330 for the various metrics of interest for hypothetical (unseen) situations. Planning module 310 then chooses the best possible option to transform the system from an SLO violated state or an inconsistent state to a new state which is under SLO conformance and also meets the desired objectives set by a system administrator. The accuracy of the planning decision is hence dependent on the accuracy of the analysis component predictions.

Figure 5:
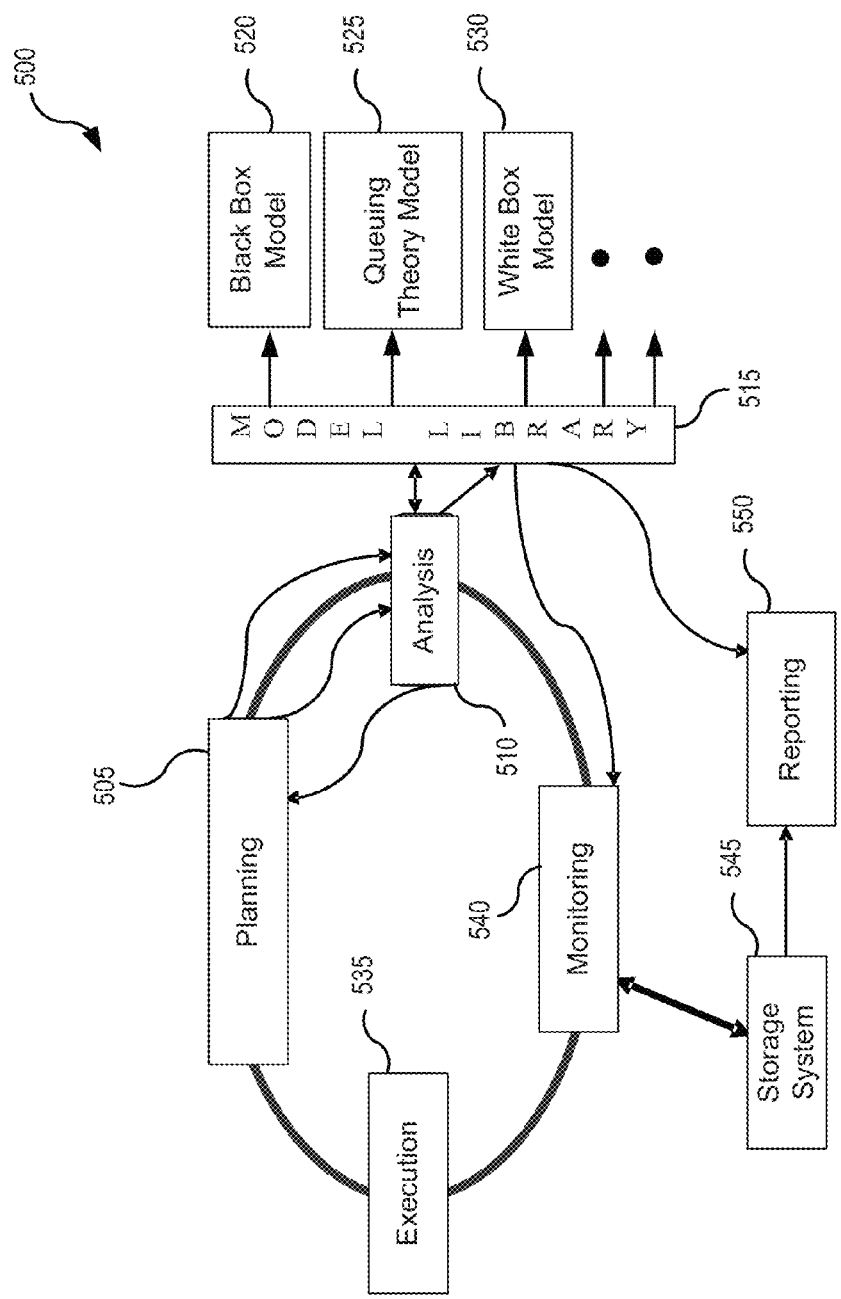
FIG. 5 is diagram illustrating interactions of components of a storage system capable of planning actions.

FIG. 5 is diagram 500 illustrating interactions of components of a storage system capable of planning actions. The embodiment illustrated in FIG. 5 shows a closed MAPE loop. The planning component 505 consults with analysis component 510 for an option evaluation of one or more potential planning actions. Analysis component 510 interfaces with model library 515 which has one or more models that can be queried or invoked for a prediction based on the applicability of the model for the situation under evaluation. The models within the model library can be stored in memory (e.g., memory 124 of FIG. 1 or as part of a separate management device). Examples of types of models that can be used include a black box model 520, a queuing theory model 525, a white box model 530, and others. Analysis component 520 determines which model or modeling paradigm to use. In accordance with various embodiments, analysis component 520 returns three values to planning component 505: the model predicted value, the error in prediction, and the associated confidence in prediction.

Planning component 505 can ignore the predictions of analysis component 510, request that a planning action be implemented using execution component 535, or trigger model re-building. For example, when the confidence in predictions is very low planning component 505 may ignore the predictions. Model building can be done in any of various ways. For example, analysis module 510 can consult monitoring module 540 to start collecting live data for storage system 545 under operation. Analysis module 510 can then use this data to refresh or re-build models within model library 515. The refreshing or re-building of the models allows for better prediction of the impact of the potential planning action on the storage system 545 in the future.

Another example of model re-building leverages reporting component 550. In some embodiments, reporting component 550 collects data from external sources such as end users or third-party monitoring services. The input and data provided by these external sources can be verified and used to refresh or re-build models within model library 515. In some cases, analysis component 510 sets a threshold on the error and confidence values returned to the planner module and invoke model re-training/re-building pro-actively.

Figure 6:
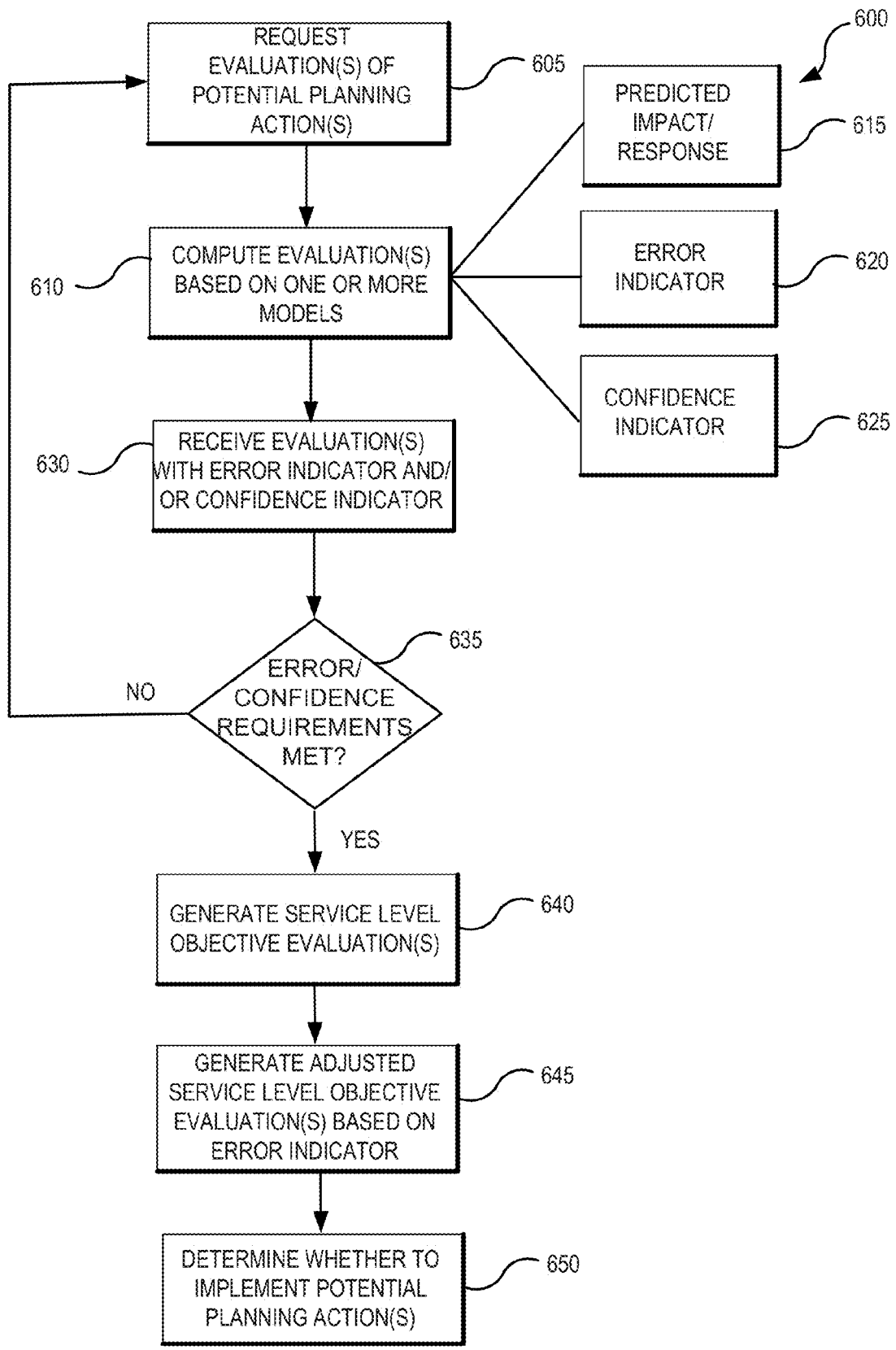
FIG. 6 is a flow chart illustrating a process for determining whether to implement one or more planning actions.

FIG. 6 is a flow chart 600 illustrating a process for determining whether to implement one or more planning actions. Various operations within this process can be performed, for example, by different modules and/or components such as planning module 310, evaluation module 320, and analysis module 330 shown in FIG. 3. Requesting operation 605 sends a request for an evaluation of a potential planning action. In some cases, for example, the request can be sent to analysis component 510 or analysis module 330. Upon receipt of the request for evaluation, computation operation 610 computes evaluations based on one or more models of all or part of the storage system. Computation operation 610 can choose which model to use (e.g., a black box model, a queuing theory model, a white box model, a combination thereof, etc.) based on one or more factors such as SLO's, type of potential planning action, system components affected by the potential planning action, and others.

The evaluation computed by computation operation 610 can include the predicted impact/response 615 of the potential planning action, an error indicator 620, and a confidence indicator 625. Receiving operation 630 receives the evaluation(s) with the error indicator and/or the confidence indicator. In some cases, the error indicator and/or the confidence indicator can be reported as a percentage, a fraction, or as a fuzzy operator (e.g., High or Low).

In some embodiments, the error indicator and the confidence indicator can be divided into two categories: High or Low. How High (H) is defined for confidence and error can be independent of the technique. For example, H for confidence can mean greater than ninety percent while H for error can mean anything above twenty-five percent. In addition, a Boolean value called isHigherbetter can be defined as true (T) for throughput (the higher the actual value from its expected SLO target the better it is) and false (F) for latency. The following table illustrates the eight combinations:

| Case no | Confidence % | Error % | isHigherbetter |
|---------|--------------|---------|----------------|
| 1 | H | H | F |
| 2 | H | H | T |
| 3 | H | L | F |
| 4 | H | L | T |
| 5 | L | H | F |
| 6 | L | H | T |
| 7 | L | L | F |
| 8 | L | L | T |

This table shows the combinations of confidence and error values that could be associated with a model prediction where: H indicates high and L indicates Low. Based on this information, for example, requirement operation 635 can determine whether the error indicator and/or the confidence indicator meet the requirements necessary to use an evaluation. For example, in some embodiments, a planning module may always accept predictions with a confidence indicator that is high (e.g., greater than ninety percent). Any evaluation with a confidence indicator below ninety percent could be ignored and not evaluated as an option.

If requirement operation 635 determines that either the error or confidence requirements are not met, then requirement operation 635 branches to requesting operation 605 where the evaluation of additional potential planning actions are requested. If requirement operation 635 determines that the error and confidence requirements are met, the requirement operation 635 branches to evaluation generation operation 640 that generates SLO evaluations of the planning actions that meet the error and confidence requirements. An adjusted SLO evaluation can be computed using adjustment operation 645. Various techniques can be used to compute the adjusted SLO evaluation. For example, the SLO evaluation value can be augmented by the error and confidence in the predicted value. For the cases where the planner only considers the predictions with a high confidence the error associated with the prediction can utilize a percent error, for example, to establish a band of variation around the SLO evaluation value calculated by the planner.

As a specific example, suppose the SLO evaluation value was 0.8 with an error of 0.4 (40%). By subtracting and adding the error to the SLO evaluation value and limiting the upper value to one and the lower value to zero, the SLO evaluation value could be anywhere within 0.4 to 1. In this case, the adjusted SLO evaluation value is the band from 0.4 to 1.

Determination operation 650 determines whether to implement the potential planning action based on the adjust SLO evaluation value. For the case where the adjusted SLO evaluation value is a band, there are two values (band boundaries) that can be compared when evaluating one planning option against another. Determination operation 650 can choose any planning option where both of the band boundaries are higher than the band boundaries of other options. However, this will not always occur. In some embodiments, determination operation 650 will take the conservative reading (i.e., the lower value) for a metric for a planning option if the error is high and an aggressive reading (i.e., the higher value) if error is low. Using these selected values, the potential planning options can be compared.

For example, suppose two planning options A and B are returned in the search. The adjusted SLO evaluation band for state A is {0.5, 0.7} and for state B is {0.2, 0.9}. None of the states clearly have a better adjusted SLO evaluation than the other. The predictions for state A have a ten percent error and the predictions for state B had have a thirty-five percent error. Aggressive reading of state A (i.e., 0.7) and conservative reading for state B (0.2) would mean that the planner would choose state A over state B.

Figure 7A:
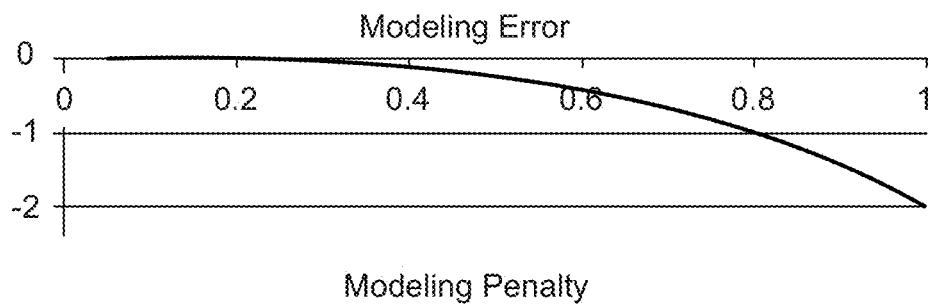
FIGS. 7A and 7B are graphs of a modeling penalty and an adjusted service level evaluation value.

Another example of how to generate an adjusted SLO evaluation is to augment the SLO evaluation value so that a single value is returned per SLO metric. Various embodiments provide for a conservative estimate when errors are high and aggressive estimate when errors are lower. In addition, these embodiments ensure the adjusted SLO evaluation value remains metric agnostic and a normalized value that can be compared. In at least one embodiment, a mathematical formulation can be used to compute a quantity called a "modeling penalty" for modeling error. As illustrated in FIG. 7A, the modeling penalty is a non linear quantity. The value of modeling penalty in this example is negative if the percent error is above 25% (e.g., in an H zone). The value of the modeling penalty can be 0 if value percent error is below 25%. Mathematically, this can be expressed as follows:

$$\text{Modeling penalty} = \begin{cases} 1 - \text{POWER}((E/T), (0.05 + (T - E))) & \text{if } (E > T) \\ 0 & \text{Otherwise} \end{cases}$$

where:

E=model generated error as a percentage; and

T=planner acceptable error as percentage (e.g., T=0.25) and the adjusted SLO evaluation value can be computed by the following formula:

adjusted SLO evaluation value=SLO evaluation value+modeling penalty

Figure 7B:
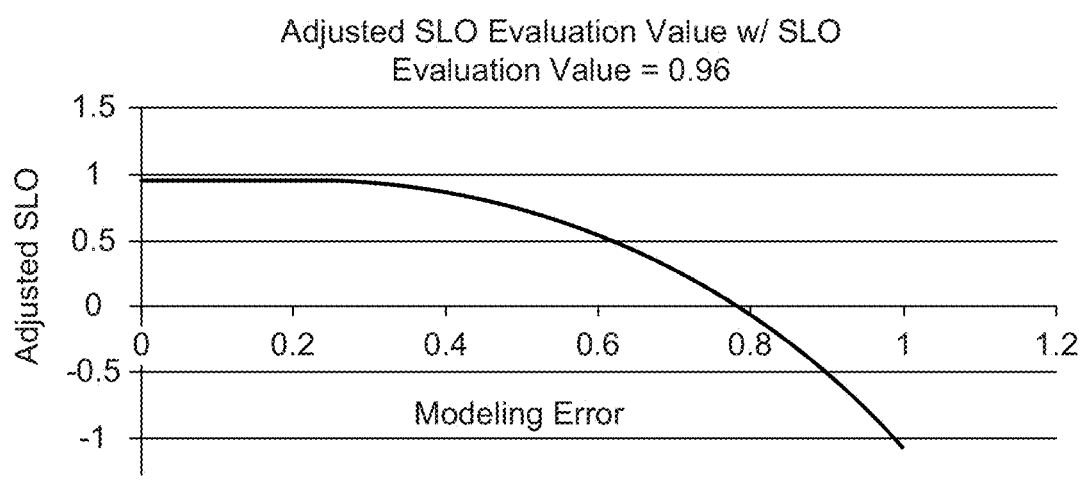

For an evaluation value of 0.96, the adjusted SLO evaluation value is shown in FIG. 7B for modeling errors between zero and one. Note that FIGS. 7A and 7B are merely examples of functions/curves that can be used in this manner.

Figure 8:
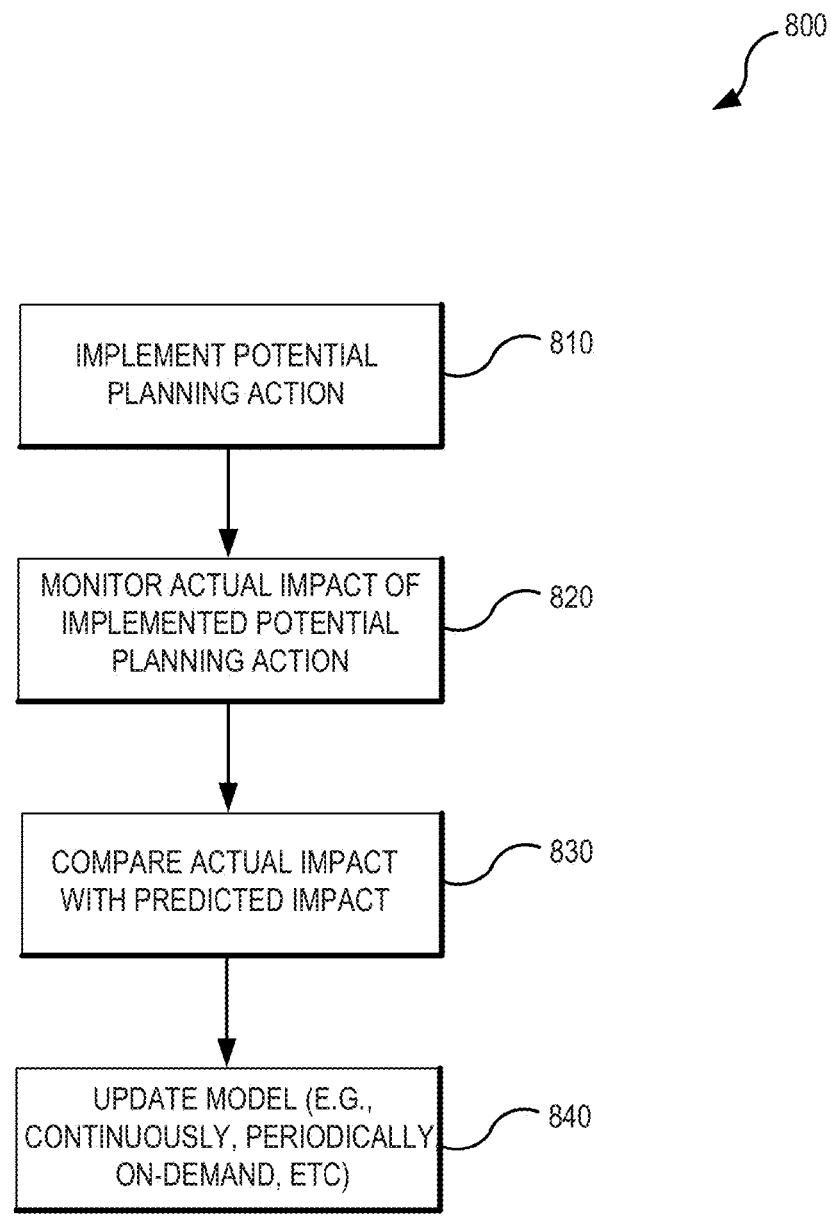
FIG. 8 is a flow chart illustrating a process for updating a storage system model.

FIG. 8 is a flow chart 800 illustrating a process for updating a storage system model. Various operations within this process can be performed, for example, by different modules and/or components such as planning module 310, evaluation module 320, analysis module 330, execution module 340, monitoring module 350, and/or reporting module 360 as shown in FIG. 3. Once a potential planning action has been implemented using implementation operation 810, monitoring operation 820 monitors the actual impact of the implemented potential planning action. The actual impact can be compared with the predicted impact using comparison operation 830. The model can be updated during update operation 840. The update may be in real-time (e.g., using an adaptive model), periodically, or on-demand (e.g., when comparison operation 830 indicates a significant discrepancy between the predicted impact and the actual impact). As a result of the model being retrained (i.e., updated) with the data collected during monitoring operation 820, the model can perform better in future calls. In some embodiments, the models can predict an impact very well under one set of conditions and not under a second set of conditions. This information may be used in generating the modeling error and/or the modeling confidence.

In some embodiments, the difference between the predicated impact and the actual impact can be fed back to analysis module 330 and used for triggering an update. In some cases, the model can be retrained when the modeling errors are consistently too high and/or the confidence in the predicted value is consistently too low. As a result, the impact of the potential planning action may not be sufficiently evaluated and a retraining request may be submitted to update the model.

In conclusion, the present invention provides novel systems, methods and arrangements for the handling of modeling errors during planning. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
   receiving, via a network, a request to determine whether to execute a planning action on a storage system; and
   in response to receiving the request,
   identifying a first storage system model and a second storage system model,
   generating an evaluation of the impact of the planning action on the storage system based, at least in part, on the first storage system model and the second storage system model, wherein the evaluation comprises a first indicator of an ability of the first storage system model to predict the impact of implementing the planning action on the storage system, wherein the evaluation further comprises a second indicator of an ability of the second storage system model to predict the impact of implementing the planning action on the storage system, and
   determining, using a processor, whether to execute the planning action based, at least in part, on determining that at least one of the first indicator or the second indicator meets a threshold requirement.

2. The method of claim 1 further comprising monitoring resource utilization of the storage system over a period of time before receiving the request.

3. The method of claim 2, wherein the first storage system model uses data associated with the monitored resource utilization to predict the impact of implementing the planning action.

4. The method of claim 1, wherein the evaluation is further based, at least in part, on a topography of the storage system.

5. The method of claim 1, wherein the planning action comprises provisioning of a new workload or migration of an existing workload.

6. The method of claim 1 further comprising:
   receiving, via the network, data associated with the performance of the storage system after the planning action has been implemented;
   determining that the first storage system model failed to predict the impact of the planning action on the storage system; and
   in response to determining that the first storage system model failed to predict the impact of the planning action on the storage system, updating the first storage system model.

7. The method of claim 1, wherein the first indicator comprises a model confidence indicator or a model error indicator, wherein the first indicator is a percentage, a fraction, or a fuzzy operator.

8. The method of claim 1, wherein generating an evaluation of the impact of the planning action on the storage system comprises:
   determining a first evaluation value associated with the first storage system model and a second evaluation value associated with the second storage system model;
   determining a first adjusted evaluation value based, at least in part, on the first evaluation value and the first indicator; and
   determining a second adjusted evaluation value based, at least in part, on the second evaluation value and the second indicator;
   wherein determining that at least one of the first indicator or the second indicator meets the threshold requirement comprises determining that at least one of the first adjusted evaluation value or the second adjusted evaluation value meets the threshold requirement.

9. A device comprising:
   a processor; and
   a computer readable storage medium coupled with the processor, wherein the computer readable storage medium includes instructions which, when executed by the processor, cause the device to,
   monitor performance characteristics of a storage system;
   detect a request to evaluate a plurality of planning actions;
   predict responses of the storage system to the plurality of planning actions;
   generate indications of reliability associated with each of the predicted responses, wherein the predicted responses and the indications of reliability are generated based at least in part, on a plurality of storage system models and the performance characteristics; and
   determine whether to implement one or more of the plurality of planning actions based, at least in part, on the predicted responses and a determination that at least one of the indications of reliability meets a threshold requirement.

10. The device of claim 9, wherein the performance characteristics include latency, utilization, or data throughput.

11. The device of claim 9, wherein at least one of the plurality of planning actions includes a data migration, adding an application, or provisioning new storage.

12. The device of claim 9, wherein the plurality of storage system models includes at least one of a black box model, a queuing theory model, or a white box model.

13. The device of claim 9, wherein the computer readable storage medium further includes instructions which, when executed by the processor, cause the device to execute at least one of the plurality of planning actions on the storage system.

14. The device of claim 9, wherein the computer readable storage medium further includes instructions which, when executed by the processor, cause the device to generate an adjusted service level objective evaluation.

15. The device of claim 9, wherein the responses are predicted based at least in part, on a topography of the storage system.

16. A non-transitory computer readable storage medium having program code embodied therewith, the pram code comprising program code to:
   request, from an analysis engine, data representing a first prediction of a first impact on a storage system of a first planning action and a second prediction of a second impact on the storage system of a second planning action;
   detect reception of the data representing the first prediction and the second prediction, wherein the data includes a first model error associated with the first planning action and a second model error associated with the second planning action;
   generate a first adjusted evaluation value based, at least in part, on a relationship between the first model error and a first threshold value;
   generate a second adjusted evaluation value based, at least in part, on a relationship between the second model error and the first threshold value; and
   determine whether to implement the first planning action or the second planning action based, at least in part on the first adjusted evaluation value and the second adjusted evaluation value.

17. The transitory computer readable storage medium of claim 16, wherein the program code further comprises program code to:
   monitor behavior of the storage system under various loads; and
   update a model of the storage system based on the monitored behavior.

18. The transitory computer readable storage medium of claim 16, wherein the program code further comprises program code to:
   execute the first planning action on the storage system;
   detect reception of a performance characteristic of the storage system after execution of the first planning action;
   determine that the first prediction does not adequately predict the performance characteristic; and
   request that the model of the storage system be retrained.

19. The transitory computer readable storage medium of claim 16, wherein the program code to generate the first adjusted evaluation value and the second adjusted evaluation value comprises program code to increase the first adjusted evaluation value from a first base evaluation value in response to a determination that the first model error is less the first threshold value and decrease the second adjusted evaluation value from a second base evaluation value in response to a determination that the second model error is equal to or greater than the first threshold value.

20. The non-transitory computer readable storage medium of claim 16, wherein the program code further comprises program code to:
   collect live data from a storage system; and
   update at least one of the first model or the second model based on the live data.

* * * * *